(No Model.)
O. P. LETCHWORTH.
COMBINED SNAP HOOK AND BUCKLE.
No. 392,926. Patented Nov. 13, 1888.
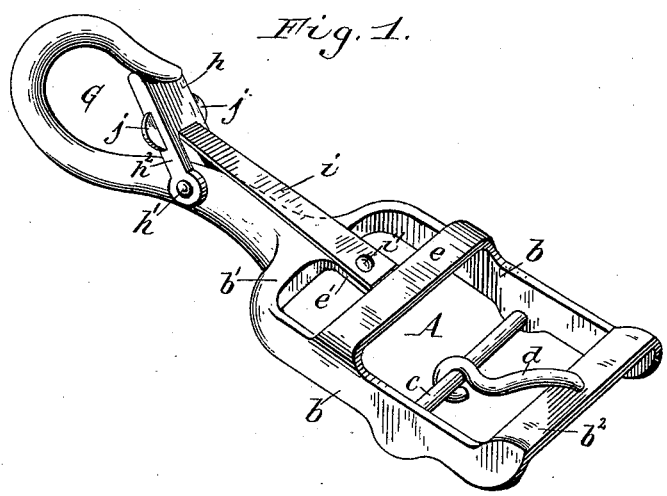
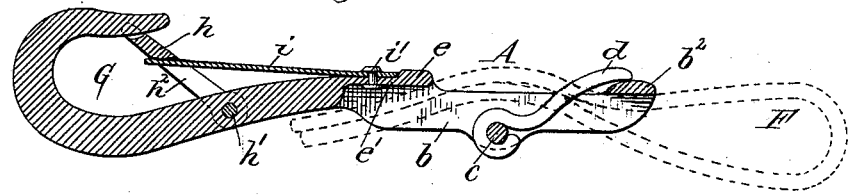
Witnesses:
Geo. Buchheit Jr.
Fred. C. Geyer
O. P. Letchworth, Inventor.
By Wilhelm Bonner
Attorneys.

UNITED STATES PATENT OFFICE.

OGDEN P. LETCHWORTH, OF BUFFALO, NEW YORK.

COMBINED SNAP-HOOK AND BUCKLE.

SPECIFICATION forming part of Letters Patent No. 392,926, dated November 13, 1888.

Application filed September 3, 1888. Serial No. 284,459. (No model.)

*To all whom it may concern:*

Be it known that I, OGDEN P. LETCHWORTH, of Buffalo, in the county of Erie and State of New York, have invented a new and useful Improvement in a Combined Snap-Hook and Buckle, of which the following is a specification.

This invention relates to a combined snap-hook and buckle, which is more particularly designed for connecting the breast-strap which is attached to the hame with the ring at the front end of the tongue or draft-pole.

My invention has the object to construct a simple and convenient combination-buckle of this character which can be cheaply produced.

The invention consists of the improvements which will be hereinafter fully described, and pointed out in the claim.

In the accompanying drawings, Figure 1 is a perspective view of my improved combined snap and buckle. Fig. 2 is a longitudinal section of the same.

Like letters of reference refer to like parts in both figures.

A represents the frame of the buckle, which is rectangular in form, and consists of side bars, $b$ $b$, and connecting end bars, $b'$ $b^2$, the end bar $b^2$ being slightly raised above the side bars, $b$, as shown.

$c$ represents a depressed cross-bar arranged between the end bars, $b'$ $b^2$, and $d$ is a tongue pivoted to the cross-bar $c$ and bearing with its free end upon the raised end bar, $b^2$.

$e$ is a raised cross-bar arranged between the end bar $b'$ and the depressed cross-bar $c$, in about the same horizontal plane with the raised end bar, $b^2$, and $e'$ is a plate or bar connecting the end bar $b'$ and intermediate cross-bar, $e$.

F is the breast-strap, which is doubled so as to form a loop, whereby the strap is attached to the ring of the draft pole or yoke and arranged with its end portions between the raised cross-bars $b^2$ and $e$ and the depressed central bar, $c$, the tongue $d$ passing through openings in both parts of the strap, as shown in Fig. 2.

G represents the snap-hook, which engages with the breast-ring of the hame and which is formed integral with the end bar $b'$ of the buckle.

$h$ represents the tongue closing the mouth of the hook and pivoted to the shank of the hook G by a rivet, $h'$. The tongue $h$ is provided with arms or legs $h^2$, which straddle the shank of the hook and through which the rivet $h'$ passes.

$i$ is a flat spring secured with its rear end to the upper side of the plate $e'$ by a rivet, $i'$, and arranged with its front portion between the legs $h^2$ of the tongue. The front end of the spring $i$ bears against the under side of the tongue $h$ and presses the latter against the nose of the hook G. The plate or bar $e'$ is preferably depressed below the intermediate cross-bar, $e$, so as to form a shoulder, against which the rear end of the spring $i$ bears and which assists in preventing lateral displacement of the spring.

$j$ represents laterally-projecting lugs or thumb-pieces formed on opposite sides of the tongue $h$, and whereby the tongue can be conveniently depressed for disengaging the hook from the breast-ring of the hame.

The snap-hook G and the buckle A are cast in one piece and form a desirable and inexpensive connection between the breast-strap and hame-ring.

It is obvious that the arrangement of the parts may be reversed, if desired, the snap-hook being attached to the ring of the tongue or yoke and the loop of the breast-strap to the hame-ring.

I claim as my invention—

A combined snap-hook and buckle composed of the snap-hook G, provided with a pivoted tongue, $h$, and spring $i$, and the buckle A, formed in one piece with the snap-hook, and consisting of side bars, $b$ $b$, end bars, $b'$ $b^2$, a central depressed cross-bar, $c$, carrying the pivoted tongue $d$, an intermediate cross-bar, $e$, arranged between the cross-bar $c$ and end bar $b'$, and a bar or plate, $e'$, connecting the bars $b'$ and $e$, and to which the spring $i$ is secured, substantially as set forth.

Witness my hand this 15th day of August, 1888.

OGDEN P. LETCHWORTH.

Witnesses:
EDWIN P. SEARS,
WILLIS M. EDWARDS.